US012750392B2

(12) United States Patent
Mullaney

(10) Patent No.: US 12,750,392 B2
(45) **Date of Patent: *Sep. 29, 2026**

(54) AUTOMATIC GENERATION OF VULNERABILITY METRICS USING MACHINE LEARNING

(71) Applicant: Tenable, Inc., Columbia, MD (US)

(72) Inventor: Cathal Mullaney, Dublin (IE)

(73) Assignee: Tenable, Inc., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/894,856

(22) Filed: Sep. 24, 2024

(65) Prior Publication Data

US 2025/0016193 A1 Jan. 9, 2025

Related U.S. Application Data

(63) Continuation of application No. 17/195,420, filed on Mar. 8, 2021, now Pat. No. 12,143,412.

(51) Int. Cl.

| | |
|---|---|
| ***H04L 29/06*** | (2006.01) |
| ***G06F 18/214*** | (2023.01) |
| ***G06F 40/284*** | (2020.01) |
| ***G06N 20/00*** | (2019.01) |
| ***H04L 9/40*** | (2022.01) |

(52) U.S. Cl.

CPC ........ *H04L 63/1433* (2013.01); *G06F 18/214* (2023.01); *G06F 40/284* (2020.01); *G06N 20/00* (2019.01)

(58) Field of Classification Search

CPC . H04L 63/1433; G06F 18/214; G06F 40/284; G06N 20/00

See application file for complete search history.

(56) References Cited

U.S. PATENT DOCUMENTS

| | | | | |
|---|---|---|---|---|
| 10,114,954 | B1 * | 10/2018 | Bellis | G06F 21/577 |
| 11,405,419 | B2 * | 8/2022 | Chen | H04L 63/0236 |
| 11,470,106 | B1 * | 10/2022 | Lin | H04L 63/1433 |
| 2017/0063908 | A1 * | 3/2017 | Muddu | G06N 20/20 |
| 2018/0063170 | A1 * | 3/2018 | Truvé | H04L 63/1416 |
| 2019/0102564 | A1 * | 4/2019 | Li | G06F 21/57 |
| 2019/0324744 | A1 * | 10/2019 | Alam | G06F 8/31 |
| 2019/0379677 | A1 * | 12/2019 | Zenz | G06F 21/554 |
| 2020/0057858 | A1 * | 2/2020 | Sharma | G06F 21/563 |
| 2020/0128047 | A1 * | 4/2020 | Biswas | H04L 67/10 |
| 2020/0274894 | A1 * | 8/2020 | Argoeti | H04L 63/1433 |
| 2021/0326531 | A1 * | 10/2021 | Kumar | G06F 40/279 |
| 2022/0004643 | A1 * | 1/2022 | Sloane | G06F 21/577 |
| 2022/0210178 | A1 * | 6/2022 | Pujar | G06F 8/51 |

* cited by examiner

*Primary Examiner* — Khalid M Almaghayreh

(74) *Attorney, Agent, or Firm* — Muncy, Geissler, Olds & Lowe, P.C.; Daniel Podhajny

(57) ABSTRACT

Techniques, methods and/or apparatuses that enable generation of vulnerability vectors of newly identified vulnerabilities (e.g., Common Vulnerability Exposures (CVEs)). Based on the textual description of the vulnerability, vulnerability vectors are generated. The generated vulnerability vectors may represent a prediction of how a third-party vulnerability scorer (e.g., United State National Vulnerability Database (US NVD)) would score the identified vulnerability.

12 Claims, 7 Drawing Sheets

AUTOMATIC GENERATION OF VULNERABILITY METRICS USING MACHINE LEARNING

CROSS-REFERENCE TO RELATED APPLICATIONS

The present application for patent is a Continuation of U.S. Non-Provisional application Ser. No. 17/195,420, entitled "AUTOMATIC GENERATION OF VULNERABITY METRICS USING MACHINE LEARNING", filed Mar. 8, 2021, assigned to the assignee hereof, and expressly incorporated herein by reference in its entirety.

TECHNICAL FIELD

Various aspects and embodiments described herein generally relate to risk identification, and more particularly to automatically generating vulnerability metrics of vulnerabilities, e.g., using machine learning.

BACKGROUND

A "vulnerability" is a weakness in the computational logic (e.g., code) found in software and some hardware components (e.g., firmware) that, when exploited, results in a negative impact to confidentiality, integrity, OR availability. When a vulnerability is discovered in a software application, a Common Vulnerability Exposure (CVE) may be filed track and disclose the vulnerability to the general public. A CVE is an entry that contains metadata about the vulnerability including an identification number, a description, and at least one public reference for publicly known cybersecurity vulnerabilities. A publicly accessible list of vulnerabilities and their associated CVEs is maintained by MITRE. A US National Vulnerability Database (NVD), which is populated by entries from the MITRE CVE list, is maintained by the US National Institute of Standards and Technology (NIST).

CVE Numbering Authorities (CNAs) are organizations that are authorized to assign CVE IDs to vulnerabilities affecting products within their distinct, agreed-upon scope, for inclusion in first-time public announcements of new vulnerabilities. CNAs include software companies who may evaluate vulnerabilities for their own products if those products fall within the scope of their responsibilities as a CNA. For example, if a vulnerability is discovered in a Microsoft™ product and is disclosed to Microsoft™ privately in advance of public disclosure, Microsoft™ can choose to assign a CVE ID and associated metadata to the vulnerability. Thus, when a vulnerability is discovered, it may be publicly disclosed. At this point, the CVE will be, or will have previously been, assigned a CVE ID by a CNA.

However, as previously described, the main source for CVE metadata is the US NVD. Also, the US NVD is considered to be the source of truth of information regarding the vulnerabilities. An issue arises in that there can be a significant delta in time between a vulnerability first being disclosed and the metadata about the vulnerability being available from the US NVD. Continuing with the previous example, if Microsoft™ then chose to publicly disclose the previously reported vulnerability, usually alongside a fix, or patch, for the vulnerability, there may be a delay of weeks, or months, before the CVE and associated metadata is available from the US NVD.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

An embodiment may be directed to a method for training a vulnerability metrics generation model. The method may be performed by a vulnerability metrics generation model trainer. The method may comprise obtaining a training dataset from one or more training vulnerability data corresponding to one or more training vulnerabilities. Each training vulnerability data may comprise a training vulnerability description and one or more training vulnerability vectors of the corresponding training vulnerability. The training vulnerability description may comprise a textual description. Each training vulnerability vector may comprise one or more training vulnerability metrics and corresponding one or more metric values. The method may also comprise training the vulnerability metrics generation model based on the training dataset. The method may further comprise providing the vulnerability metrics generation model to a vulnerability metrics generator. The vulnerability metrics generation model may enable the vulnerability metrics generator to generate one or more target vulnerability vectors of a target vulnerability based on a target vulnerability description of the target vulnerability. The target vulnerability description may comprise a textual description. Each target vulnerability vector may comprise one or more target vulnerability metrics and corresponding one or more metric values.

An embodiment may be directed to vulnerability metrics generation model trainer. The vulnerability metrics generation model trainer may comprise a memory and at least one processor coupled to the memory. The memory and the at least one processor may be configured to obtain a training dataset from one or more training vulnerability data corresponding to one or more training vulnerabilities. Each training vulnerability data may comprise a training vulnerability description and one or more training vulnerability vectors of the corresponding training vulnerability. The training vulnerability description may comprise a textual description. Each training vulnerability vector may comprise one or more training vulnerability metrics and corresponding one or more metric values. The memory and the at least one processor may also be configured to train a vulnerability metrics generation model based on the training dataset. The memory and the at least one processor may further be configured to provide the vulnerability metrics generation model to a vulnerability metrics generator. The vulnerability metrics generation model may enable the vulnerability metrics generator to generate one or more target vulnerability vectors of a target vulnerability based on a target vulnerability description of the target vulnerability. The target vulnerability description may comprise a textual description. Each target vulnerability vector may comprise one or more target vulnerability metrics and corresponding one or more metric values.

An embodiment may be directed to a non-transitory computer-readable medium storing computer-executable instructions for a vulnerability metrics generation model trainer. The computer-executable instructions may comprise one or more instructions causing the vulnerability metrics generation model trainer to obtain a training dataset from one or more training vulnerability data corresponding to one or more training vulnerabilities. Each training vulnerability data may comprise a training vulnerability description and one or more training vulnerability vectors of the corresponding training vulnerability. The training vulnerability description may comprise a textual description. Each training vulnerability vector may comprise one or more training vulnerability metrics and corresponding one or more metric values. The computer-executable instructions may also comprise one or more instructions causing the vulnerability metrics generation model trainer to train a vulnerability metrics generation model based on the training dataset. The computer-executable instructions may further comprise one or more instructions causing the vulnerability metrics generation model trainer to provide the vulnerability metrics generation model to a vulnerability metrics generator. The vulnerability metrics generation model may enable the vulnerability metrics generator to generate one or more target vulnerability vectors of a target vulnerability based on a target vulnerability description of the target vulnerability. The target vulnerability description may comprise a textual description. Each target vulnerability vector may comprise one or more target vulnerability metrics and corresponding one or more metric values.

An embodiment may be directed to vulnerability metrics generation model trainer. The vulnerability metrics generation model trainer may comprise means for obtaining a training dataset from one or more training vulnerability data corresponding to one or more training vulnerabilities. Each training vulnerability data may comprise a training vulnerability description and one or more training vulnerability vectors of the corresponding training vulnerability. The training vulnerability description may comprise a textual description. Each training vulnerability vector may comprise one or more training vulnerability metrics and corresponding one or more metric values. The vulnerability metrics generation model trainer may also comprise means for training a vulnerability metrics generation model based on the training dataset. The vulnerability metrics generation model trainer may further comprise means for providing the vulnerability metrics generation model to a vulnerability metrics generator. The vulnerability metrics generation model may enable the vulnerability metrics generator to generate one or more target vulnerability vectors of a target vulnerability based on a target vulnerability description of the target vulnerability. The target vulnerability description may comprise a textual description. Each target vulnerability vector may comprise one or more target vulnerability metrics and corresponding one or more metric values.

An embodiment may be directed to a method for generating vulnerability metrics. The method may be performed by a vulnerability metrics generator. The method may comprise receiving a target vulnerability description of a target vulnerability, the target vulnerability description comprising a textual description. The method may also comprise generating, by a vulnerability metrics generator, one or more target vulnerability vectors of the target vulnerability based on the target vulnerability description. Each target vulnerability vector may comprise one or more target vulnerability metrics and corresponding one or more metric values. The vulnerability metrics generator may comprise a vulnerability metrics generation model trained on a training dataset to generate vulnerability vectors. The training dataset may have been obtained from one or more training vulnerability data corresponding to one or more training vulnerabilities. Each training vulnerability data may comprise a training vulnerability description and one or more training vulnerability vectors of the corresponding training vulnerability. The training vulnerability description may comprise a textual description. Each training vulnerability vector may comprise one or more training vulnerability metrics and corresponding one or more metric values.

An embodiment may be directed to vulnerability metrics generator. The vulnerability metrics generator may comprise a memory and at least one processor coupled to the memory. The memory and the at least one processor may be configured to receive a target vulnerability description of a target vulnerability, the target vulnerability description comprising a textual description. The memory and the at least one processor may also be configured to generate one or more target vulnerability vectors of the target vulnerability based on the target vulnerability description. Each target vulnerability vector may comprise one or more target vulnerability metrics and corresponding one or more metric values. The vulnerability metrics generator may comprise a vulnerability metrics generation model trained on a training dataset to generate vulnerability vectors. The training dataset may have been obtained from one or more training vulnerability data corresponding to one or more training vulnerabilities. Each training vulnerability data may comprise a training vulnerability description and one or more training vulnerability vectors of the corresponding training vulnerability. The training vulnerability description may comprise a textual description. Each training vulnerability vector may comprise one or more training vulnerability metrics and corresponding one or more metric values.

An embodiment may be directed to a non-transitory computer-readable medium storing computer-executable instructions for a vulnerability metrics generator. The computer-executable instructions may comprise one or more instructions causing the vulnerability metrics generator to receive a target vulnerability description of a target vulnerability, the target vulnerability description comprising a textual description. The computer-executable instructions may also comprise one or more instructions causing the vulnerability metrics generator to generate one or more target vulnerability vectors of the target vulnerability based on the target vulnerability description. Each target vulnerability vector may comprise one or more target vulnerability metrics and corresponding one or more metric values. The vulnerability metrics generator may comprise a vulnerability metrics generation model trained on a training dataset to generate vulnerability vectors. The training dataset may have been obtained from one or more training vulnerability data corresponding to one or more training vulnerabilities. Each training vulnerability data may comprise a training vulnerability description and one or more training vulnerability vectors of the corresponding training vulnerability. The training vulnerability description may comprise a textual description. Each training vulnerability vector may comprise one or more training vulnerability metrics and corresponding one or more metric values.

An embodiment may be directed to vulnerability metrics generator. The vulnerability metrics generator may comprise means for receiving a target vulnerability description of a target vulnerability, the target vulnerability description comprising a textual description. The vulnerability metrics generator may also comprise means for generating one or more target vulnerability vectors of the target vulnerability based on the target vulnerability description. Each target vulnerability vector may comprise one or more target vulnerability metrics and corresponding one or more metric values. The vulnerability metrics generator may comprise a vulnerability metrics generation model trained on a training dataset to generate vulnerability vectors. The training dataset may have been obtained from one or more training vulnerability data corresponding to one or more training vulnerabilities. Each training vulnerability data may comprise a training vulnerability description and one or more training vulnerability vectors of the corresponding training vulnerability. The training vulnerability description may comprise a textual description. Each training vulnerability vector may comprise one or more training vulnerability metrics and corresponding one or more metric values.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
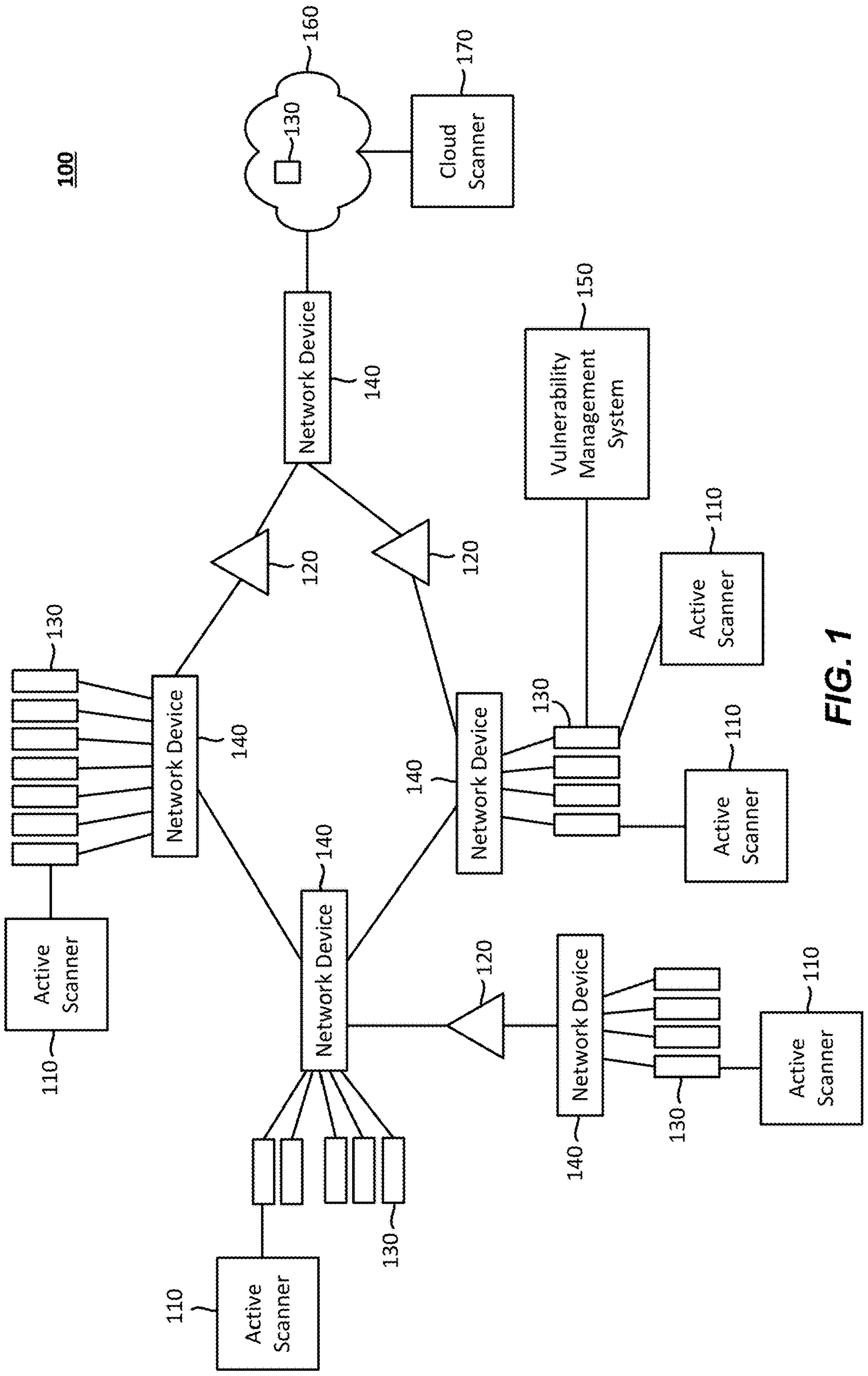
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), transport layer security (TLS) certificate, etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, industrial control system, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof.

Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

FIG. 1 illustrates an exemplary network 100 having various assets 130 that are interconnected via one or more network devices 140 and managed using a vulnerability management system 150. More particularly, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

The assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations.

Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived assets like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100. The network 100 may include one or more active scanners 110 configured to communicate packets or other messages within the network 100 to detect new or changed information describing the various network devices 140 and other assets 130 in the network 100. For example, in an implementation, the active scanners 110 may perform credentialed or uncredentialed audits to scan certain assets 130 in the network 100 and obtain information that may then be analyzed to identify potential vulnerabilities in the network 100. More particularly, in an implementation, the credentialed audits may include the active scanners 110 using suitable authentication technologies to log into and obtain local access to the assets 130 in the network 100 and perform any suitable operation that a local user could perform thereon without necessarily requiring a local agent.

Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.).

On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In an implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic.

The reconstructed sessions may then be used in combination with the information obtained with the active scanners 110 to build a model or topology describing the network 100. For example, in an implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In an implementation, the passive scanners 120 may further apply various signatures to the information in the observed traffic to identify vulnerabilities in the network 100 and determine whether any data in the observed traffic potentially targets such vulnerabilities. In an implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In an implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications).

Furthermore, in an implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In an implementation, the passive scanners 120 may observe as many sessions in the network 100 as possible to provide optimal visibility into the network 100 and the activity that occurs therein. For example, in an implementation, the passive scanners 120 may be deployed at any suitable location that enables the passive scanners 120 to observe traffic going into and/or out of one or more of the network devices 140. In an implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in an implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
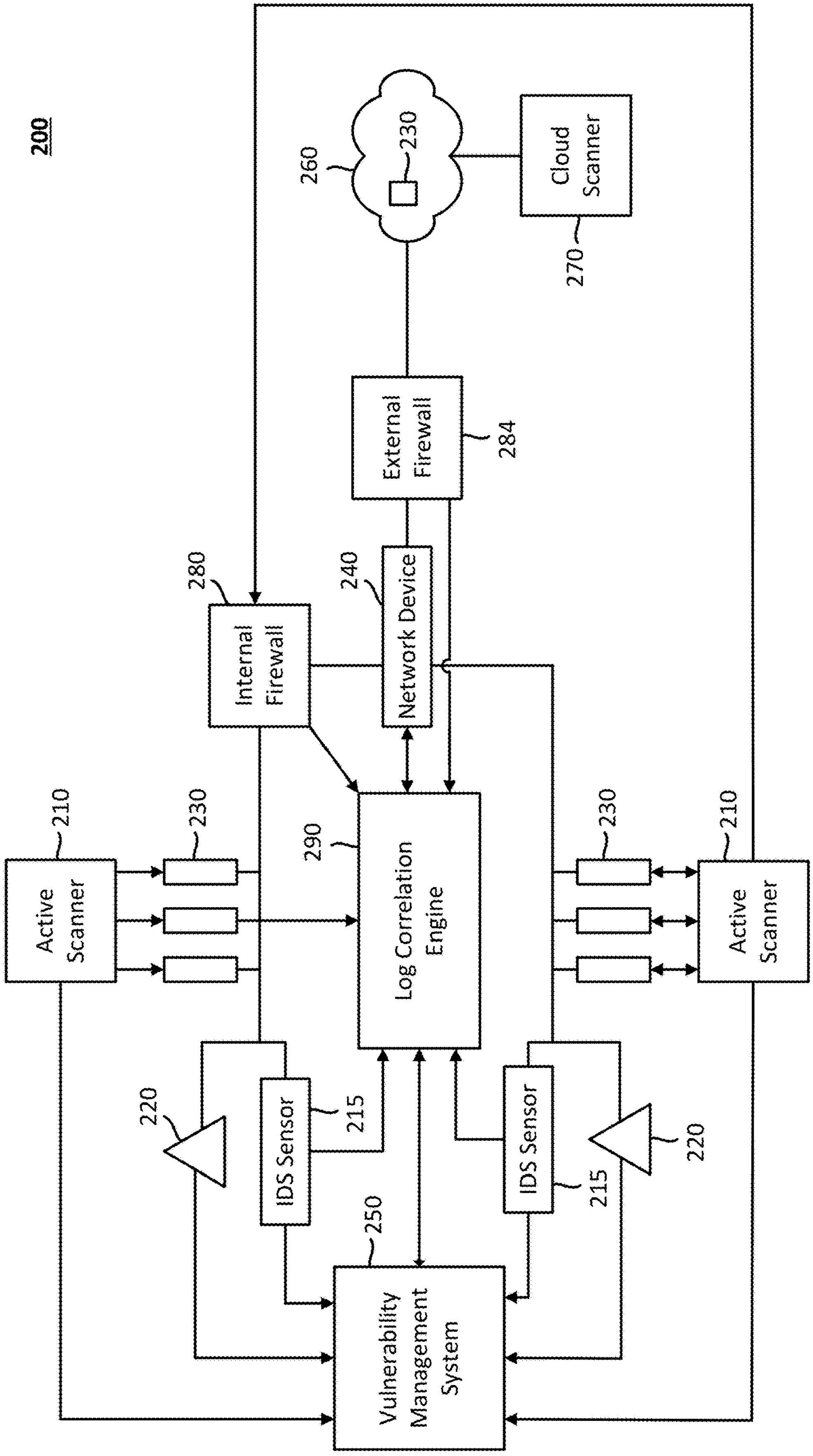
FIG. 2 illustrates another exemplary network having various assets that can be managed using a vulnerability management system, according to various aspects.

FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in an implementation, the network 200 may include one or more active scanners 210 and/or cloud scanners 270, which may interrogate assets 230 in the network 200 to build a model or topology of the network 200 and identify various vulnerabilities in the network 200. The network 200 may also include one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in an implementation, a log correlation engine 290 may be arranged to receive logs containing events from various sources distributed across the network 200. For example, in an implementation, the logs received at the log correlation engine 290 may be generated by internal firewalls 280, external firewalls 284, network devices 240, assets 230, operating systems, applications, or any other suitable resource in the network 200. Accordingly, in an implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In an implementation, the active scanners 210 may be strategically distributed in locations across the network 200 to reduce stress on the network 200. For example, the active scanners 210 may be distributed at different locations in the network 200 to scan certain portions of the network 200 in parallel, whereby an amount of time to perform the active scans may be reduced. Furthermore, in an implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260. The term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in an implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may be configured to scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in an implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In an implementation, in response to obtaining the snapshot of the network 200, the active scanners 210 and/or cloud scanners 270 may then report the information describing the snapshot to the vulnerability management system 250, which may use the information to remediate and otherwise manage the vulnerabilities and assets in the network.

Furthermore, in an implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in an implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in an implementation, the passive scanners 220 may be deployed directly within or adjacent to an intrusion detection system (IDS) sensor 215, which may provide the passive scanners 220 with visibility relating to intrusion events or other security exceptions that the IDS sensor 215 identifies. In an implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In an implementation, the information that the passive scanners 220 obtains from sniffing the traffic traveling across, originating from, or directed to the network 200 may therefore provide a real-time record describing the activity that occurs in the network 200. Accordingly, in an implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In an implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In an implementation, the log correlation engine 290 may normalize the events contained in the various logs received from the sources distributed across the network 200, and in an implementation, may further aggregate the normalized events with information describing the snapshot of the network 200 obtained by the active scanners 210 and/or the network traffic observed by the passive scanners 220. Accordingly, in an implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in an implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or activities observed by the passive scanners 220 to comprehensively monitor, remediate, and otherwise manage the vulnerabilities and assets in the network 200. Additionally, in an implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and/or the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

As indicated above, a CNA may evaluate a vulnerability of its own product, assign a CVE ID and associated metadata to the vulnerability when the vulnerability is disclosed to the public. A Common Vulnerability Scoring System (CVSS) is an open framework for communicating characteristics and severity of software vulnerabilities. A set of CVSS metrics may be published as part of the metadata associated with a CVE. These metrics may be calculated by the CNA that first registers the vulnerability and published with the initial CVE disclosure, but this is not always the case and policies vary between CNAs.

In certain instances, CNAs may disagree about the calculation of a set of CVSS metrics for a vulnerability. As an illustration, consider Microsoft™ producing their own CVSS metric calculations and the US NVD calculating a different set of metrics for the same vulnerability. It may be unclear which metric should be trusted. To compound the issue, the differing CVSS metrics may not be available at the same time due to the publishing delta between different CNAs. In particular and as indicated above, there can be a significant a significant time delta—i.e., a delay—between a vulnerability first being disclosed and the metadata about the vulnerability being available from the US NVD.

As the US NVD is considered the source of truth for information on vulnerabilities, the CVSS metrics produced by the US NVD are widely considered as the scoring authority for vulnerability scoring and production of CVSS metrics. Bearing this in mind, it is proposed to bridge the gap between the publishing of a CVE and associated vulnerability metadata by a non-NVD CNA and the final publication of the CVE by NVD including associated CVSS metrics. In short, it is proposed to calculate or otherwise generate CVSS metrics that more closely resemble the CVSS metrics published by the NVD with CVE information provided from the non-NVD CNA. More generally, it is proposed to calculate or otherwise generate vulnerability metrics from information provided from non-authoritative scoring entities.

In an aspect, this may be accomplished by training a supervised Machine Learning model to produce a vulnerability metric (e.g., CVSS metric) based on a vulnerability's description. Since a description of the vulnerability is required to publish a CVE, it can be assured that a description will always be available for a vulnerability once a CVE has been published. As this is a supervised Machine Learning algorithm, a corpus of existing descriptions from the US NVD may be used train the model.

The proposed technique may automatically generate a vulnerability metric including a vector and score (e.g., CVSS vector and score) based on a description as supplied by a non-authoritative scoring entity (e.g., software vendor). In many instances, software vendors do not produce their own CVSS metrics, or do produce their own metrics that are ultimately inconsistent with metrics that have been previously produced by the defacto source of truth for vulnerability data, the US NVD. With the proposed technique, using previously created descriptions and vulnerability metrics, a previously unseen vulnerability description may be taken to produce a new vulnerability metric.

A significant main advantage of the proposed technique is that the process may be automated and require little to no manual intervention. The proposed technique does not require any difficult to maintain static rules or complex code in the vulnerability metric generation steps. Also, the model can also be retrained as new descriptions and associated vulnerability metrics become available. The proposed technique may produce highly accurate vulnerability metrics based on metrics previously published by an authoritative scoring entity, e.g., US NVD.

As indicated, it is proposed to train a supervised Machine Learning model to produce a CVSS metric based on a vulnerability's description. In an aspect, the model produced may be viewed as an application of the document/text classification problem. The text describing a vulnerability may be classified with regard to each individual component of a CVSS metric. Since a description of a vulnerability is required to publish a CVE, description of the vulnerability will be available when the CVE is made available. As this is a supervised Machine Learning algorithm, a corpus of existing descriptions from the US NVD may be used train the model.

Various phases—training set collection, feature extraction, training, and prediction—of the proposed technique/process are described below. For ease of reference and understanding, the application of the proposed techniques to CVE, CVSS, and US NVD will be described. However, it should be understood that the particular concepts described may be applied more generally.

Training Set Collection Phase:

During training set collection, data on as much of available CVEs and associated metadata may be gathered from the NVD and pre-processed to facilitate use in Machine Learning model training. Training may then be achieved by a specific form of feature extraction (bag-of-words). In this feature extraction form, words from the descriptions may be tokenized, counted and normalized to produce a high-dimensional sparse dataset, which may be used to train the model.

Feature Extraction Phase:

During feature extraction, words from each of the available descriptions may be extracted and recorded. The grammar and exact word order may be discarded. However, a count of words within the description may be maintained. Further normalization and language processing may be applied to the extracted data, including the removal of stop words, the use of stemming and other natural language processing (NLP) methods. This data may then be recorded in a high dimensional, sparse, matrix and associated with the individual components of the vulnerability scoring (e.g., CVSS) metrics that will ultimately be predicted.

A run of the initial feature extraction for a training phase may produce a sparse matrix with dimensions of the number of rows equal to the number of documents in the initial training set and the number of columns equal to the number of words extracted from the training data corpus. The dimensionality of the matrix may then scale with respect to the number of documents contained within the training set.

As a concrete example, a training set containing one hundred thousand documents may end up with over a million features extracted and entered into a sparse training matrix. This would lead to a matrix which contains one hundred thousand rows, with each row representing an individual document within the training set, and one million columns with each individual column representing a unique feature extracted from at least one document and containing the count of that feature's occurrences within the document represented at that particular row. In a most trivial case, a feature may be considered as a word extracted from at least one document. Alternatively (and perhaps more realistic), a feature may be a hash of a word or n-gram or some other abstracted feature.

A training matrix may be considered sparse in that a large proportion of the million columns in the mentioned example would be set to zero, indicating the feature, or word, is not actually present in the document represented by a specific row in the matrix. In the case of a high dimensional sparse matrix, it is expected that most feature columns (e.g., more than 50%) would be set to zero for most, if not all, documents. The training set feature matrix allows for relationships between different documents to be inferred by mining for features which are present across different documents with the same label. This can ultimately allow the training set feature matrix to be leveraged in order to apply labels to documents that have not previously been seen by the system.

This dataset may then represent training and verification datasets that will be used to train and verify/test the trained models.

Training Phase:

During training, each individual component of the CVSS metric may be trained in isolation. This is possible due to the modular nature of the CVSS metrics. Once training for an individual component is complete, the model may then be stored for later retrieval during verification and final prediction phases.

Prediction Phase:

Once the models are successfully trained to an acceptable degree of accuracy, the models may then be applied to previously unseen descriptions. In this way, CVSS metrics can be produced for vulnerability descriptions published from any source.

During prediction phase, a previously unseen description may be ingested, feature extraction may be performed, and a prediction for each section of a CVSS metric may be produced. Relative confidence for each prediction may also be recorded. Once all sections of the CVSS metric have been predicted, along with related accuracy confidence (e.g., in the form of a probability), the confidence of the full metric may be calculated. If the confidence of the predicted metric falls below a defined threshold, the metric may be determined to be not useful and discarded.

Prediction Phase Example

The following provides an example of the Prediction Phase—the phase in which the trained model is used to generate CVSS metric from a CVE identified and published by a CNA (Microsoft™ in this example).

a. Microsoft™ releases the CVE CVE-2020-0674 along with associated metadata.
b. The description for CVE-2020-0674 reads as follows:
    i. A remote code execution vulnerability exists in the way that the scripting engine handles objects in memory in Internet Explorer. The vulnerability could corrupt memory in such a way that an attacker could execute arbitrary code in the context of the current user. An attacker who successfully exploited the vulnerability could gain the same user rights as the current user. If the current user is logged on with administrative user rights, an attacker who successfully exploited the vulnerability could take control of an affected system. An attacker could then install programs; view, change, or delete data; or create new accounts with full user rights. In a web-based attack scenario, an attacker could host a specially crafted website that is designed to exploit the vulnerability through Internet Explorer and then convince a user to view the website. An attacker could also embed an ActiveX control marked "safe for initialization" in an application or Microsoft Office™ document that hosts the IE rendering engine. The attacker could also take advantage of compromised websites and websites that accept or host user-provided content or advertisements. These websites could contain specially crafted content that could exploit the vulnerability. The security update addresses the vulnerability by modifying how the scripting engine handles objects in memory.

c. In addition to this, Microsoft™ calculates the following CVSS version 3 (CVSS3) metric:
   i. cvss3_base_vector: CVSS:3.0/AV:N/AC:H/PR:H/UI:R/S:U/C:H/I:H/A:H
   ii. cvss3_base_score: 6.4
d. This summary is published several hours before the US NVD entry is available.
e. In the absence of the NVD source of truth, the proposed (e.g., Machine Learning classification) process is used to calculate CVSS2 and CVSS3 metrics:
f. The metrics calculated, with a high degree of confidence, are as follows:
   i. cvss2_base_vector: CVSS2 #AV:N/AC:H/Au:N/C:C/I:C/A:C
   ii. cvss2_base_score: 7.6
   iii. cvss3_base_vector: CVSS:3.0/AV:N/AC:H/PR:N/UI:R/S:U/C:H/I:H/A:H
   iv. cvss3_base_score: 7.5
g. The calculated CVSS3 vector differs from that produced by Microsoft™.
h. Microsoft™ chose not to produce any CVSS2 vector.
i. Several hours later, US NVD publishes a CVE entry for CVE-2020-0674. The description is as follows:
   i. A remote code execution vulnerability exists in the way that the scripting engine handles objects in memory in Internet Explorer, aka 'Scripting Engine Memory Corruption Vulnerability'. This CVE ID is unique from CVE-2020-0673, CVE-2020-0710, CVE-2020-0711, CVE-2020-0712, CVE-2020-0713, CVE-2020-0767.
j. US NVD also publishes the following metrics:
   i. cvss2_base_vector: CVSS2 #AV:N/AC:H/Au:N/C:C/I:C/A:C
   ii. cvss2_base_score: 7.6
   iii. cvss3_base_vector: CVSS:3.0/AV:N/AC:H/PR:N/UI:R/S:U/C:H/I:H/A:H
   iv. cvss3_base_score: 7.5

In this instance, it is seen that the predicted metrics—i.e., the calculated CVSS2 and CVSS3 metrics—are accurate with respect to the NVD metrics. In summary, it is proposed to apply machine learning to fully generate a vulnerability metric (e.g., vector and/or score) without the need for user defined rules based on natural language phrasing found in descriptions. Note that a full vector may be produced rather than just the final score. Producing a full vector rather can be technically advantageous in that it can allow better insight into different aspects of a vulnerability that are not visible when only a score is calculated.

Figure 3:
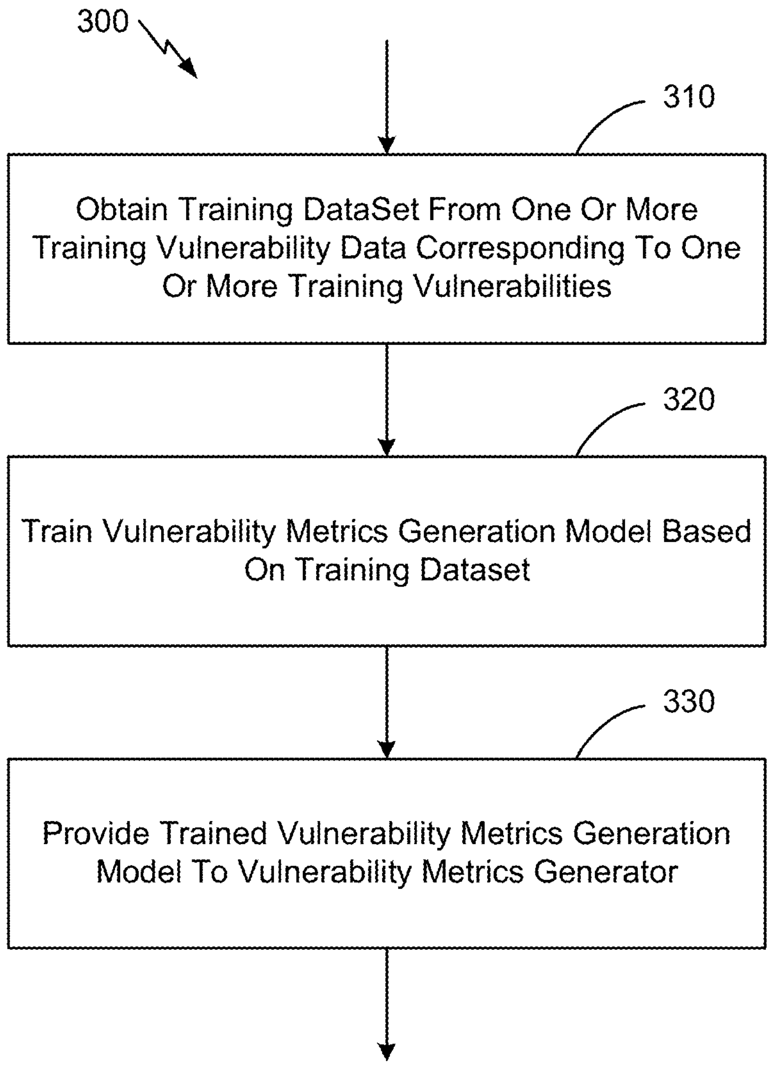
FIGS. 3-5 illustrate flow charts of an example method for training a vulnerability metrics generation model, according to various aspects.

FIG. 3 illustrates a flow chart of an example method 300 for training a vulnerability metrics generation model. The method 300 may be performed by a vulnerability metrics generation model trainer. In an aspect, the vulnerability management system 150, 250 may also perform vulnerability metrics generation model trainer functions. In block 310, the vulnerability metrics generation model trainer may obtain a training dataset associated vulnerabilities whose true or otherwise accurate vulnerability metrics and scores have been determined. For example, the CVEs and corresponding CVSS vectors and scores maintained at US NVD may be examples of such vulnerabilities and corresponding vectors and scores.

As will be seen further below, data related to the vulnerabilities already identified and scored by authoritative third parties (e.g., US NVD) may be used to train the vulnerability metrics generation model. Hence, the term "training" will be used to preface such data and their components.

Thus, in block 310, the vulnerability metrics generation model trainer may obtain a training dataset from one or more training vulnerability data corresponding to one or more training vulnerabilities. As indicated, CVEs may be examples of the training vulnerabilities. Each training vulnerability data may comprise a training vulnerability description of the corresponding training vulnerability. The training vulnerability description may be a textual description. Each training vulnerability data may also comprise one or more training vulnerability vectors of the corresponding training vulnerability. Each training vulnerability vector may comprise one or more training vulnerability metrics and corresponding one or more metric values.

In an aspect, a CVSS vector may be an example of the training vulnerability vector. Thus, each training vulnerability vector of at least one training vulnerability data may comprise any one or more of the following metrics and corresponding metric values:

- attack vector (AV) metric with possible values of network (N), adjacent (A), local (L), and physical (P);
- attack complexity (AC) metric with possible values of low (L) and high (H);
- a privileges required (PR) metric with possible values of none (N), low (L), and high (H);
- a user interaction (UI) metric with possible values of none (N) and required (R);
- a scope(S) metric with possible values of unchanged (U) and changed (C);
- a confidentiality (C) metric with possible values of high (H), low (L), and none (N);
- an integrity (I) metric with possible values of high (H), low (L), and none (N);
- an availability (A) metric with possible values of high (H), low (L), and none (N).

Figure 4:
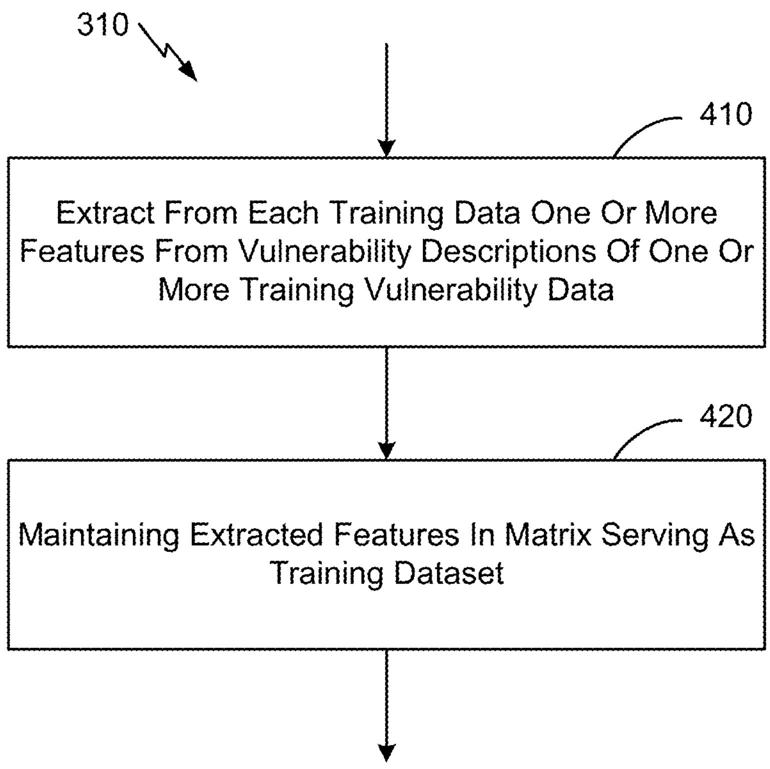

FIG. 4 illustrates a flow chart of an exemplary process that may be performed, e.g., by the vulnerability metrics generation model trainer, to implement block 310. In block 410, the vulnerability metrics generation model trainer may extract one or more training features from the training vulnerability description of the one or more training vulnerability data. In an aspect, the training features may be extracted through natural language process (NLP). For example "bag-of-words" model may be used for the training feature extraction. The extracted training features may be tokenized, counted and normalized.

In block 420, the vulnerability metrics generation model trainer may maintain the extracted training features in a matrix, which may serve as the training dataset. All of the training vulnerabilities may be represented in the rows of the matrix. For example, each row may represent one of the training vulnerabilities. In particular, each row of the matrix may represent the training vulnerability description of one of the training vulnerabilities. Also all of the extracted training features may be represented in the columns of the matrix. For example, each column may represent one of the extracted training features. Then in an aspect, each row x column entry may indicate a count of the extracted training feature represented by the column is present in the training vulnerability data represented by the row.

In an aspect, the matrix may be high-dimensional sparse matrix. That is, a majority (e.g., more than 50%) or even a super majority (e.g., more than 80%) of the entries may be set to zero.

Referring back to FIG. 3, in block 320, the vulnerability metrics generation model trainer may train a vulnerability metrics generation model based on the training dataset. In an aspect, the vulnerability metrics generation model may be a supervised machine learning model.

Figure 5:
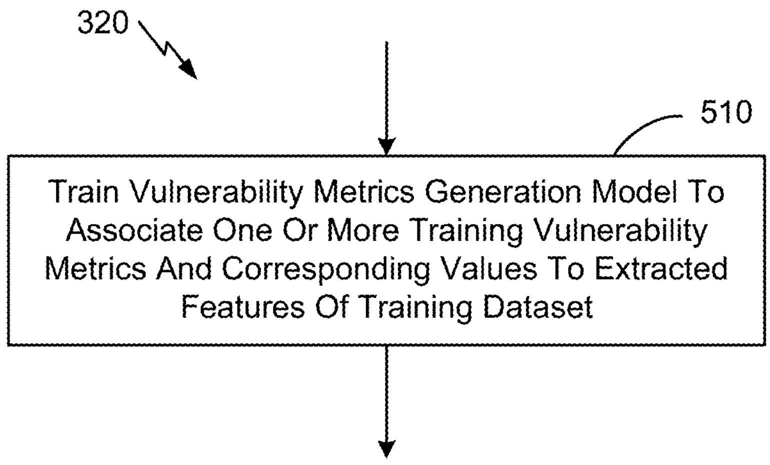

FIG. 5 illustrates a flow chart of an exemplary process that may be performed, e.g., by the vulnerability metrics generation model trainer, to implement block 320. In block 510, the vulnerability metrics generation model trainer may train the vulnerability metrics generation model to associate the one or more training vulnerability metrics and corresponding vulnerability metric values to the extracted training features of the training dataset. For example, one association may be made between a metric:value combination "AV:N" (attack vector (AV) metric with value network (N)) with the extracted training features. Another association may be made between a metric:value combination "AC:H" (attack complexity (AC) metric with value high (H)) with the extracted training features. A third association may be made between a metric:value combination "AV:L" (attack vector (AV) metric with value network (N)).

In an aspect, in block 510, the vulnerability metrics generation model may be trained to associate each training vulnerability metric to the extracted training features separately from other training vulnerability metrics. For example, an association of the AV metric and corresponding values to the extracted training features may be made separately from an association of the AC metric and corresponding values to extracted training features being made. Indeed, in an aspect, an association between each "metric: value" combination and the extracted training features may be made in isolation. For example, an association of "AV:N" combination to the extracted training features may be made separately from an association of "AV:P" combination to the extracted training features.

Note that in an aspect, multiple vulnerability scoring versions may be represented in the training vulnerability data. For example, at least one training vulnerability, there may be a first training vulnerability vector of a first vulnerability scoring version (e.g., CVSS2 vector) and a second training vulnerability vector of a second vulnerability scoring version (e.g., CVSS3.0 vector). The number of vulnerability scoring versions may be any number.

Referring back to FIG. 3, in block 330, the vulnerability metrics generation model trainer may provide the vulnerability metrics generation model to a vulnerability metrics generator. With the vulnerability metrics generation model, the vulnerability metrics generator may be capable of generating one or more target vulnerability vectors of a target vulnerability based on a target vulnerability description of the target vulnerability.

Figure 6:
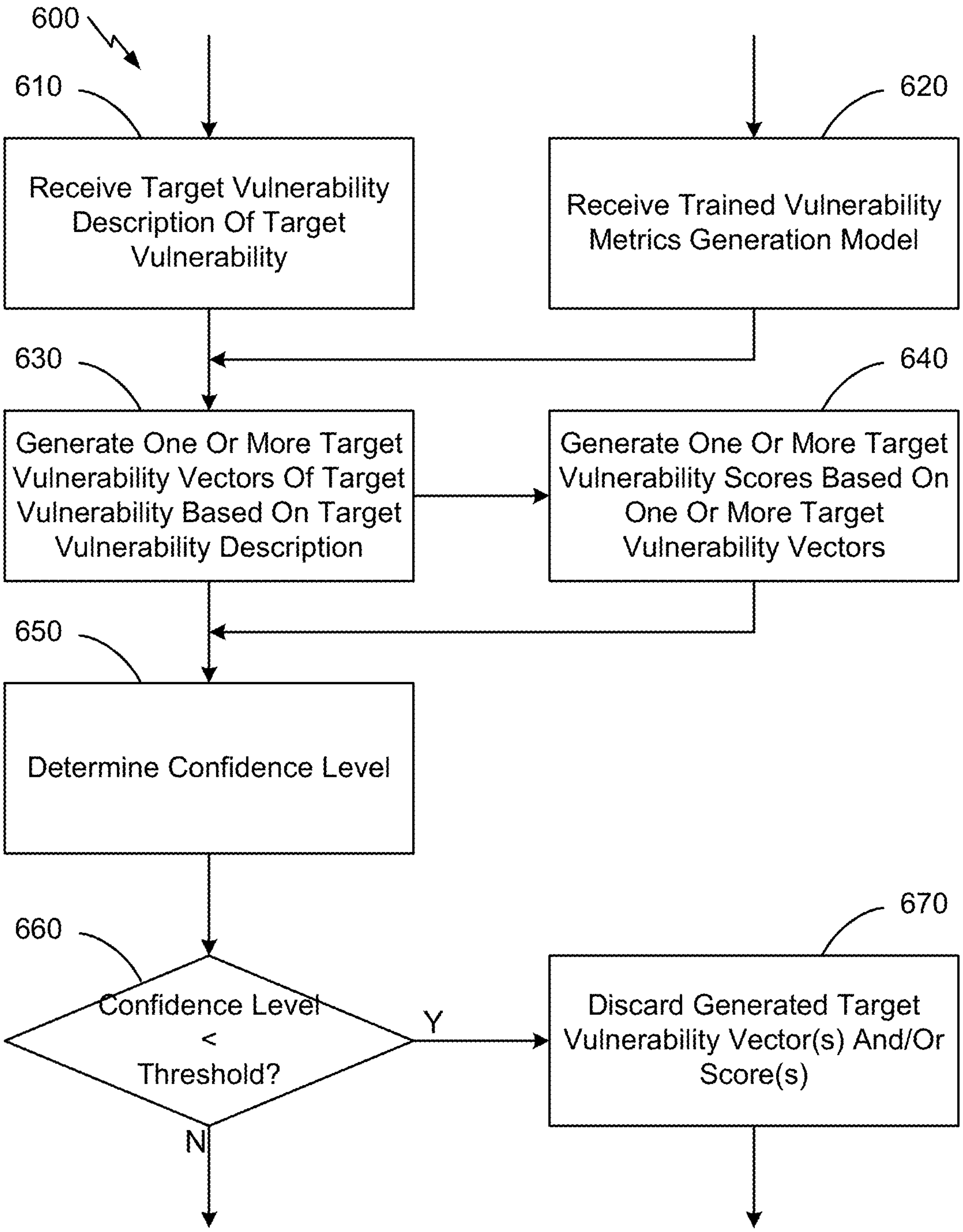
FIGS. 6-8 illustrate flow charts of an example method for generating one or more vulnerability vectors, according to various aspects.

FIG. 6 illustrates a flow chart of an example method 600 for generating vulnerability metrics. The method 600 may be performed by a vulnerability metrics generator. In an aspect, the vulnerability management system 150, 250 may also perform vulnerability metrics generation model trainer functions. In block 610, the vulnerability metrics generator may receive a target vulnerability description of a target vulnerability. The target vulnerability description may comprise a textual description.

In block 620, the vulnerability metrics generator may receive a trained vulnerability metrics generation model, e.g., from a vulnerability metrics generation model trainer. The vulnerability metrics generation model may be trained on a training dataset to generate one or more target vulnerability vectors of a target vulnerability. The training dataset has been described above, and thus is not repeated here.

In an aspect, the target vulnerability may not be any one of the one or more training vulnerabilities of the training dataset. In other words, the target vulnerability may be a previously unseen vulnerability.

Figure 7:
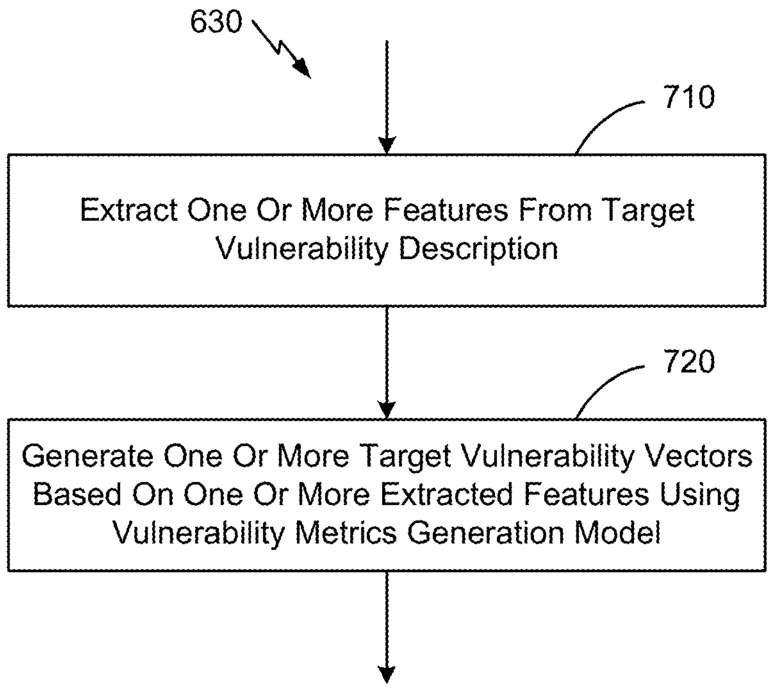

In block 630, the vulnerability metrics generator may generate one or more target vulnerability vectors based on the target vulnerability description. FIG. 7 illustrates a flow chart of an exemplary process that may be performed, e.g., by the vulnerability metrics generator, to implement block 630.

In block 710, the vulnerability metrics generator may extract one or more target features from the target vulnerability description. In an aspect, the target features may be extracted through natural language process (NLP). For example "bag-of-words" model may be used for the target feature extraction. The extracted target features may be tokenized, counted and normalized.

In block 720, the vulnerability metrics generator may generate the one or more target vulnerability vectors based on the one or more extracted target features using the vulnerability metrics generation model.

Figure 8:
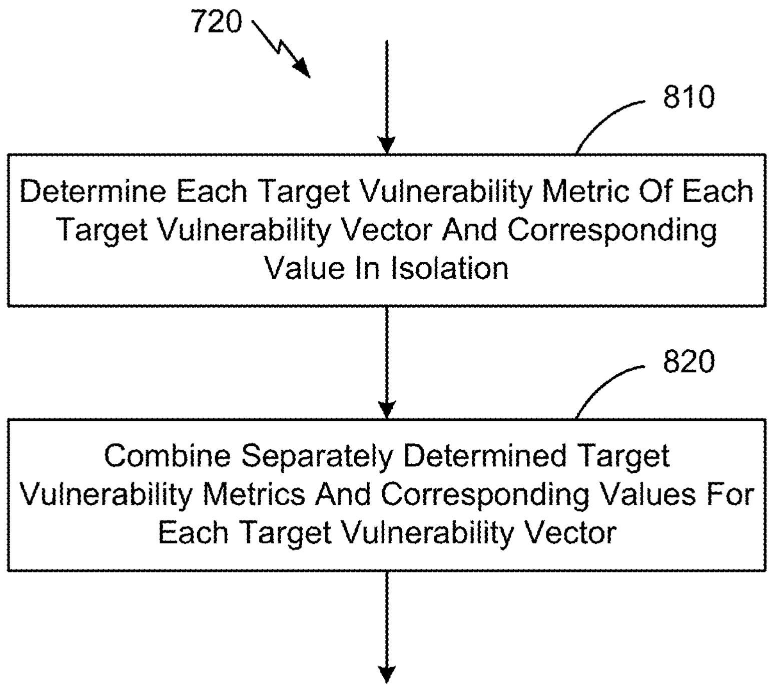

FIG. 8 illustrates a flow chart of an exemplary process that may be performed, e.g., by the vulnerability metrics generator, to implement block 720. In block 810, the vulnerability metrics generator may determine each target vulnerability metric of each target vulnerability vector and its corresponding metric value in isolation.

In block 820, the vulnerability metrics generator may combine the separately determined target vulnerability metrics and their corresponding metric values for each target vulnerability vector.

Referring back to FIG. 6, after block 630, the method 600 may finish, i.e., only the one or more target vulnerability vectors may be generated. Alternatively, the method may proceed to block 640 or to block 650 (discussed further below). Note that in block 630, more than one target vulnerability vectors may be generated. When this occurs, the multiple target vulnerability vectors may be a vulnerability vectors of multiple vulnerability scoring versions (e.g., CVSS2, CVSS3.0, CVSS3.1, etc.). For example, the one or more target vulnerability vectors may include at least first and second target vulnerability vectors. The first target vulnerability vector may be a vulnerability vector of a first vulnerability scoring version and the second target vulnerability vector may be a vulnerability vector of a second vulnerability scoring version different from the first vulnerability scoring version.

Further, it may be that one or more vendor-provided vulnerability vectors of the target vulnerability may be received (e.g., Microsoft's own cvss3_base_vector described above). In an aspect, the vendor-provided vulnerability vectors may be ignored, i.e., not used to generate the one or more target vulnerability generators.

In block 640, the vulnerability metrics generator may generate one or more target vulnerability scores of the target vulnerability based on the one or more target vulnerability vectors. In an aspect, each target vulnerability score may be generated using a scoring calculator of the vulnerability version corresponding to that target vulnerability score. Again, when multiple target vulnerability scores are generated, they may be vulnerability scores of multiple vulnerability scoring versions.

In block 650, the vulnerability metrics generator may determine a confidence level for each target vulnerability vector.

In block 660, the vulnerability metrics generator may determine whether the confidence level of each target vulnerability vector is less than a threshold confidence level. If not, then the method 600 may finish, at least for that target vulnerability vector.

On the other hand, if it is determined that the confidence level of that target vulnerability vector is less than the threshold confidence level, then in block 670, the vulnerability metrics generator may discard that target vulnerability vector. In addition, the vulnerability metrics generator may also discard the target vulnerability score generated from that target vulnerability vector.

Figure 9:
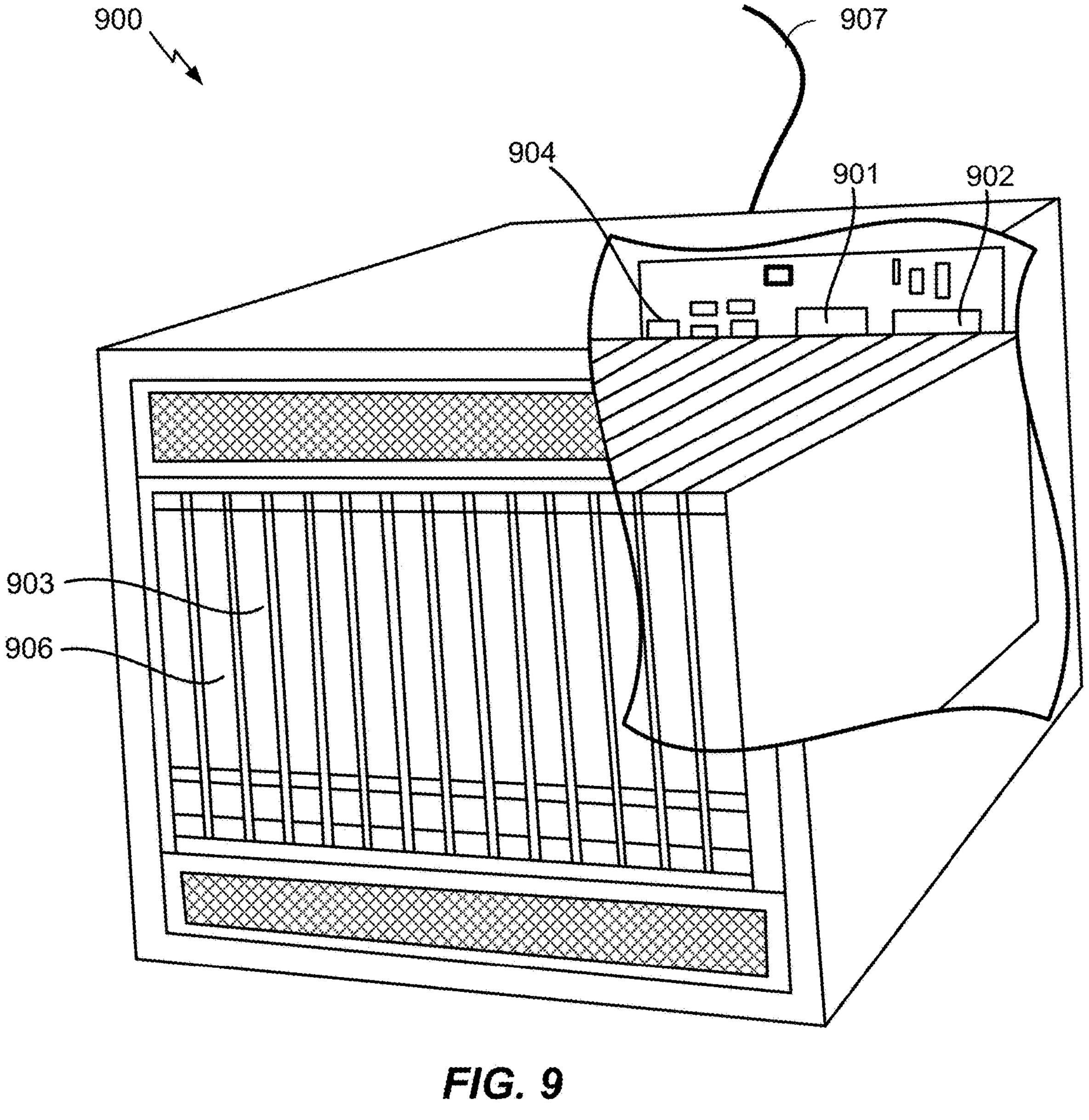
FIG. 9 illustrates an apparatus, according to various aspects.

The various embodiments may be implemented on any of a variety of commercially available computing devices, such as an apparatus 900 illustrated in FIG. 9. In an example, the apparatus 900 may correspond to one example configuration of a computing device on applications that train the vulnerability metrics generation model, e.g., as part of a vulnerability metrics generation model trainer configured to perform the method 300 illustrated in FIGS. 3-5. In another example, the apparatus 900 may correspond to one example configuration of a computing device on applications that generate the target vulnerability vectors, e.g., as part of a vulnerability metrics generator configured to perform the method 600 illustrated in FIGS. 6-8.

In FIG. 9, the apparatus 900 may include one or more processors 901 coupled to volatile memory 902 and a large capacity nonvolatile memory, such as a disk drive 903. The apparatus 900 may also include a floppy disc drive, flash/solid state media drive, compact disc (CD) or DVD disc drive 906 coupled to the one or more processors 901. The apparatus 900 may also include network access ports 904 coupled to the one or more processors 901 for establishing data connections with a network 907, such as a local area network coupled to other broadcast system computers and servers or to the Internet. The network access ports 904 may be more broadly described as communicators 904.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, flash/solid state media, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method to generate vulnerability metrics, the method comprising:

receiving a target vulnerability description of a target vulnerability, the target vulnerability description comprising a textual description; and generating, by a vulnerability metrics generation machine learning (ML) model, one or more target vulnerability vectors of the target vulnerability as an inference that is based on providing the target vulnerability description as an input to the vulnerability metrics generation ML model, each target vulnerability vector comprising one or more target vulnerability metrics and corresponding one or more metric values, wherein the target vulnerability is already identified as a vulnerability before generating the one or more target vulnerability vectors, wherein the vulnerability metrics generation ML model has been trained on a training dataset to generate vulnerability vectors, the training dataset having been obtained from one or more training vulnerability data corresponding to one or more training vulnerabilities, each training vulnerability data comprising a training vulnerability description and one or more training vulnerability vectors of the corresponding training vulnerability, the training vulnerability description comprising a textual description, and each training vulnerability vector comprising one or more training vulnerability metrics and corresponding one or more metric values, and wherein the target vulnerability is not a part of any of the one or more training vulnerabilities previously seen by the vulnerability metrics generation ML model.

2. The method of claim 1, wherein the one or more training vulnerabilities include at least one common vulnerability exposure (CVE), and wherein for the at least one CVE, each training vulnerability vector is a common vulnerability scoring system (CVSS) vector.

3. The method of claim 1, wherein for each training vulnerability vector of at least one training vulnerability data, the one or more training vulnerability metrics of that training vulnerability vector comprise any one or more of an attack vector (AV), an attack complexity (AC), a privileges required (PR), a user interaction (UI), a scope(S), a confidentiality (C), an integrity (I), and/or an availability (A), and/or wherein the one or more target vulnerability metrics of the target vulnerability vector include any one or more of the AV, the AC, the PR, the UI, the S, the C, the I, and/or the A.

4. The method of claim 1, wherein generating the one or more target vulnerability vectors of the target vulnerability comprises:

extracting one or more target features from the target vulnerability description; and generating the one or more target vulnerability vectors based on the one or more extracted target features using the vulnerability metrics generation ML model.

5. The method of claim 4, wherein natural language processing (NLP) is used to extract the target features from the target vulnerability description.

6. The method of claim 4, wherein the extracted target features are tokenized, counted and normalized.

7. The method of claim 4, wherein generating the one or more target vulnerability vectors comprises:

determining each target vulnerability metric of each target vulnerability vector and its corresponding metric value in isolation; and combining the separately determined target vulnerability metrics and their corresponding metric values for each target vulnerability vector.

8. The method of claim 1, further comprising:

generating one or more target vulnerability scores of the target vulnerability based on the one or more target vulnerability vectors.

9. The method of claim 1, wherein when the one or more target vulnerability vectors include at least first and second target vulnerability vectors, the first target vulnerability vector is a vulnerability vector of a first vulnerability scoring version and the second target vulnerability vector is a vulnerability vector of a second vulnerability scoring version different from the first vulnerability scoring version.

10. The method of claim 1, further comprising:

determining one or more confidence levels of the one or more target vulnerability vectors; and for each target vulnerability vector, if the confidence level of that target vulnerability vector is below a threshold confidence level, discarding that target vulnerability vector.

11. The method of claim 1, wherein the one or more target vulnerability vectors are generated independently of any vendor-provided vulnerability vectors.

12. A vulnerability metrics generator, comprising:

a memory; and at least one processor coupled to the memory, wherein the memory and the at least one processor are configured to:

receive a target vulnerability description of a target vulnerability, the target vulnerability description comprising a textual description; and generate one or more target vulnerability vectors of the target vulnerability as an inference that is based on providing the target vulnerability description as an input to a vulnerability metrics generation machine learning (ML) model, each target vulnerability vector comprising one or more target vulnerability metrics and corresponding one or more metric values, wherein the target vulnerability is already identified as a vulnerability before generating the one or more target vulnerability vectors, wherein the vulnerability metrics generation ML model has been trained on a training dataset to generate vulnerability vectors, the training dataset having been obtained from one or more training vulnerability data corresponding to one or more training vulnerabilities, each training vulnerability data comprising a training vulnerability description and one or more training vulnerability vectors of the corresponding training vulnerability, the training vulnerability description comprising a textual description, and each training vulnerability vector comprising one or more training vulnerability metrics and corresponding one or more metric values, and wherein the target vulnerability is not a part of any of the one or more training vulnerabilities previously seen by the vulnerability metrics generation ML model.

* * * * *